United States Patent [19]

Chiron

[11] 4,436,281

[45] Mar. 13, 1984

[54] BUTTERFLY VALVE WITH AN IMPROVED OBTURATION DEVICE

[75] Inventor: Alain Chiron, Oloron Sainte Marie, France

[73] Assignee: Applications Mecaniques et Robinetterie Industrielle, France

[21] Appl. No.: 344,046

[22] Filed: Jan. 29, 1982

Related U.S. Application Data

[63] Continuation of Ser. No. 152,411, May 22, 1980.

[30] Foreign Application Priority Data

May 23, 1979 [FR] France .................................. 79 13175

[51] Int. Cl.³ .............................................. F16K 1/22
[52] U.S. Cl. ..................................... 251/305; 251/306
[58] Field of Search ................................. 251/305, 306

*Primary Examiner*—Martin P. Schwadron
*Assistant Examiner*—James R. Shay
*Attorney, Agent, or Firm*—Scully, Scott, Murphy & Presser

[57] ABSTRACT

The invention relates to a butterfly valve having an improved closure element. This valve comprises a seat perpendicular to the axis of the valve and an offset butterfly gate, optionally off-center in relation to its drive axis, the peripheral edge surface of the butterfly gate presenting a form such that its normals in the regions situated on both sides of the plane of symmetry of the butterfly gate, passing through its axis of rotation, intersect the axis of symmetry of the joint or seal at two distinct points, $C_1$ and $C_2$.

9 Claims, 16 Drawing Figures

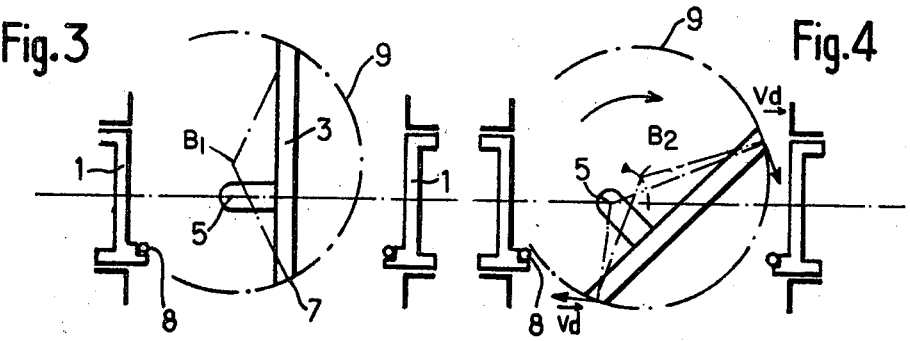
Fig.3 Fig.4 Fig.5
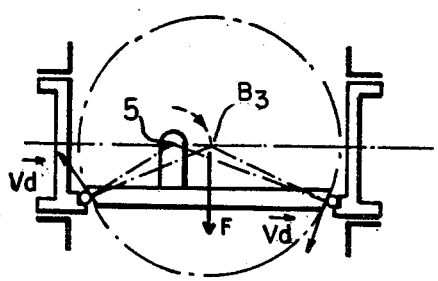
Fig.6
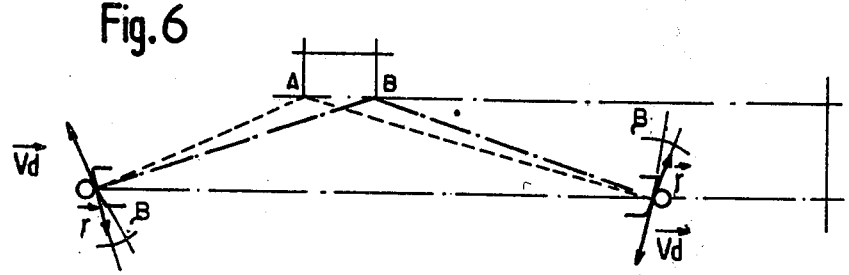
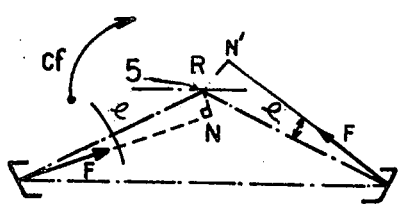
Fig.7
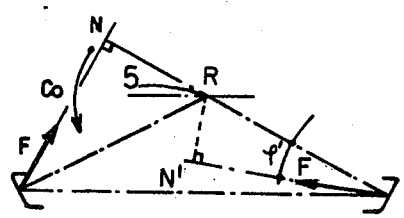
Fig.8

BUTTERFLY VALVE WITH AN IMPROVED OBTURATION DEVICE

This is a continuation of application Ser. No. 152,411, filed May 22, 1980.

BACKGROUND OF THE INVENTION

1. Field of the Invention

The present invention relates to a closure element device for a butterfly valve having a valve seat perpendicular to the axis of the valve.

It is applied more particularly, but not exclusively, to butterfly valves in which the seat, of circular configuration, is situated in a plane perpendicular to the axis of the valve and is optionally positioned off-center relative to the drive axis of the butterfly gate.

2. Discussion of the Prior Art

It is known that in such valves, closure is in general obtained, starting from the open position of the valve, by a rotation of the butterfly gate from an angle substantially equal to 90°, at the end of which the edge of the butterfly gate contacts and compresses the valve seat, thus closing the valve.

In a more precise way, the valve seat which can consist, for example, of a flexible metallic joint or an elastomeric joint, assures on the one hand, a completely closed valve, referred to as the static condition, and, on the other hand, an open valve position referred to as the dynamic condition.

In the presently known butterfly valves, in which the butterfly gate is offset or off-center with respect to two axes, there is presented a peripheral edge surface of spherical form coming to rest on a circular joint, compression being effected by a displacement of the spherical surface encompassing the surface of the peripheral edge of the butterfly gate, herein referred to subsequently as the spherical surface, resulting in the movement of the spherical surface into the circular joint. One will note concerning this that in general the spherical surface of the butterfly gate is centered in the plane passing through the axis of the shafts of the butterfly gate which is parallel to the plane of the butterfly gate.

Thus, in such valves, the relative butterfly gate seat displacement is obtained by positioning the axis of the shafts and the plane of symmetry of the butterfly in off-center positions. The angle formed by the displacement vector of the butterfly gate and the tangent to the aforementioned spherical surface, is very small, which results in substantial friction between the seat and the butterfly. As a consequence, the restraining forces resulting from the action of the butterfly gate on the seat produce a considerable torque relative to the axis of rotation, which gives rise to significant torque forces both in opening the closing the valve.

SUMMARY OF THE INVENTION

The invention has, therefore, for its purpose to eliminate or substantially reduce these drawbacks. It proposes for this purpose a butterfly valve comprising a closure element, the movements of which are largely the same as those previously described but which is designed to assure a distribution of the restraining forces or resisting stresses between the edge of the closure element and the fluid-tight joint or seal such that the absolute value of these forces and their levering activity in relation to the axis of the shafts is maintained at a minimum, in order to reduce a minimum the resultant friction and the opening torque.

DESCRIPTION OF THE PREFERRED EMBODIMENTS

In order to obtain this result, the butterfly valve, according to the invention comprises a butterfly gate which has a peripheral edge surface which presents a form such that its normals $\vec{N}$, in the regions situated on both sides of the plane of symmetry of the butterfly gate passing through its axis of rotation, intersect the axis of symmetry of the joint or seal at two points $C_1$ and $C_2$ and that, for the zones situated on a level with the passages of the axes, defined by the sectors forming an angle on both sides of the plane of symmetry passing through the axis of rotation, the points of intersection of the normals is limited by the two above-named points, the variation of a point of intersection being effectuated progressively and in a continuous way from $C_1$ to $C_2$.

According to other embodiments of the invention, the forms of the peripheral edge surface of the closure element satisfying these conditions can consist in the following:

the combination or merging of two spherical forms centered at the points $C_1$, $C_2$ and connected between them by a continuous succession of elementary spherical portions so as to assure a progressive passage of one of the spherical forms to the other:

the combination or merging two conical forms centered on the axis of symmetry of the seat and whose normals passing through the points of contact of the seat, are converging to the points $C_1$ and $C_2$ previously defined and connected between them by a continuous succession of elementary conical portions the angle of which at the apex varies progressively;

the combination or merging of toroid surfaces of which the center of the generating circle, the points of butterfly seat contact and the points $C_1$ and $C_2$ are aligned, with the connection between the two toroid surfaces being made by a continuous succession of elementary toroid forms;

the combination or merging of two multitoroid surfaces, this form being constituted by at least two torus portions of which the centers of the director circles, the points of butterfly seat contact and the distinct points $C_1$ and $C_2$ are aligned.

According to another embodiment of the invention, some forms of the peripheral edge surface of the butterfly gate approaching those previously described can be advantageously obtained by superposition of circular discs of low thickness (theoretically of negligible thickness), initially coaxial and machined in such a way that this superposition presents a cross-sectional surface or revolution (spherical, conical, toroid, etc.) and whose centers are then displaced and disposed according to a curve previously defined.

Some modes of realization of the invention will be described hereafter, as non-limiting examples in which FIGS. 1–11 illustrate the problem addressed by the present invention, of FIGS. 12 and 13 show the general principle of the invention, and further wherein:

FIGS. 3, 4 and 5 are schematic sections illustrating the rotational movement of the valve shown in FIGS. 1 and 2.

FIGS. 6, 7 and 8 are schematic representations illustrating the different parameters intervening in the opening and closing of the valve shown in FIGS. 1 to 5, in the case of a standard arrangement;

Figure 1:
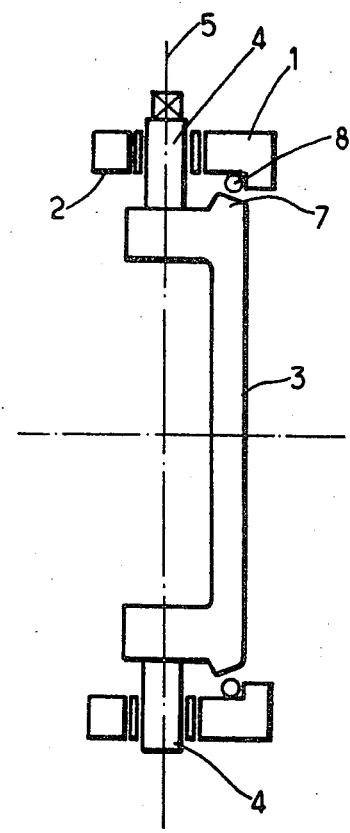
FIGS. 1 and 2 are two schematic sections, passing through the axis of rotation of the butterfly gate (FIG. 1) and perpendicular to the axis of rotation of the butterfly gate (FIG. 2), of an offset butterfly valve positioned off-center, about two axes, in relation to its axis of rotation.
Figure 2:
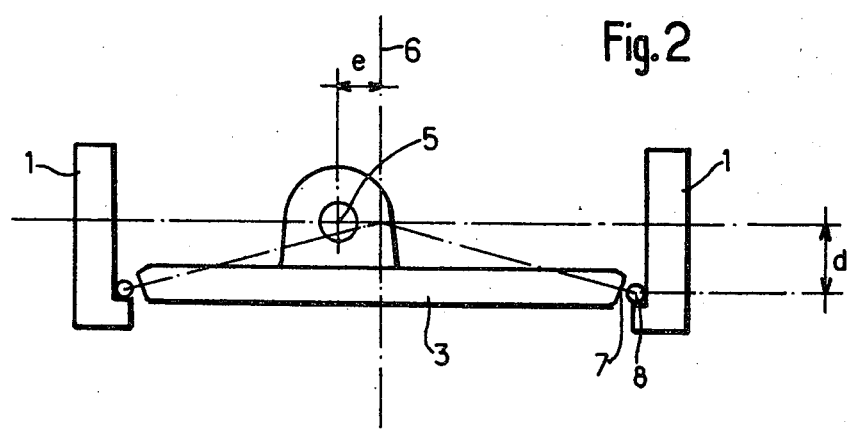

The butterfly valve represented in FIGS. 1 and 2 comprise, in a standard manner, a body 1 with a cylinder bore, on the inside of which is pivotally mounted a butterfly gate 3 by means of coaxial shafts 4 displaced off-center with respect to butterfly gate 3. In a more precise manner, a first offset displacement of the shafts is equal to the distance d between the common axis 5 of these shafts and the butterfly gate, a second eccentric offset of the shafts is equal to the distance e of the common axis 5 of the shafts 4 to the axis of symmetry 6 of the sealing peripheral edge surface 7 of the butterfly and of the valve seat 8. As can be seen on FIGS. 3, 4 and 5, the sealing edge surface 7 of the butterfly gate presents a movement of a sphere 9 generally encompassing the peripheral edge surface of butterfly gate.

In the open position (FIG. 3) of the valve, the butterfly gate 3 is disposed parallel to the axis of flow of the valve (axis of the bore), the center $B_1$ of the sphere 9 being situated above the axis of rotation 5 of butterfly gate 3. Starting from this position, the closing of the valve is obtained by pivoting butterfly gate 3 around axis 5, during which movement, the center of the sphere 9 describes a circular trajectory passing through an intermediate position represented by the point $B_2$ (FIG. 4) up to the closing position represented by the point $B_3$ (FIG. 5). At the end of this movement, the peripheral surface 7 of the butterfly gate 3 whose displacement vector Vd has been indicated, comes to compress the seal or joint 8 forming the seat of the valve.

As one can see from FIG. 6 which represents schematically, on a greater scale, butterfly gate 3 in the closed position, the angle of compression "B" formed by the displacement vector of the peripheral edge surface of butterfly gate Vd and the tangent $\vec{t}$ to the sphere of the peripheral edge surface 7, is very small, which gives rise to substantial friction between seat 8 and butterfly gate 3.

FIGS. 7 and 8 show that the resulting restraining force F exercised on butterfly gate 3 exert a levering action NA, N'A in relation to the axis of rotation 5, being of importance, which results in significant torques Co and Cf both in opening and closing of the value.

As previously mentioned, the invention has for its purpose the elimination of these disadvantages. The solution that it proposes for this end is as valid for off-center butterfly valves as for valves with reduced or zero off-center displacement.

Figure 9:
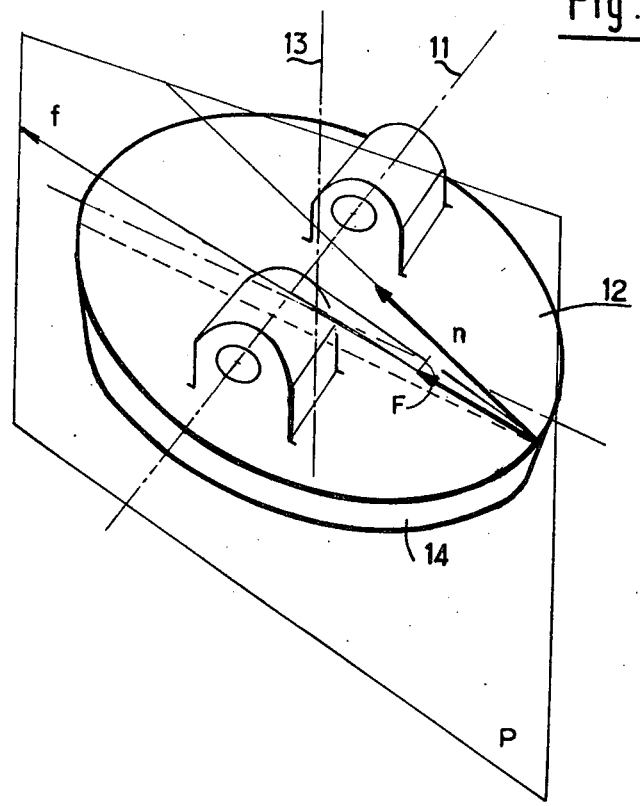
FIG. 9 is a schematic perspective of a butterfly having a zero off-center displacement.
Figure 17:
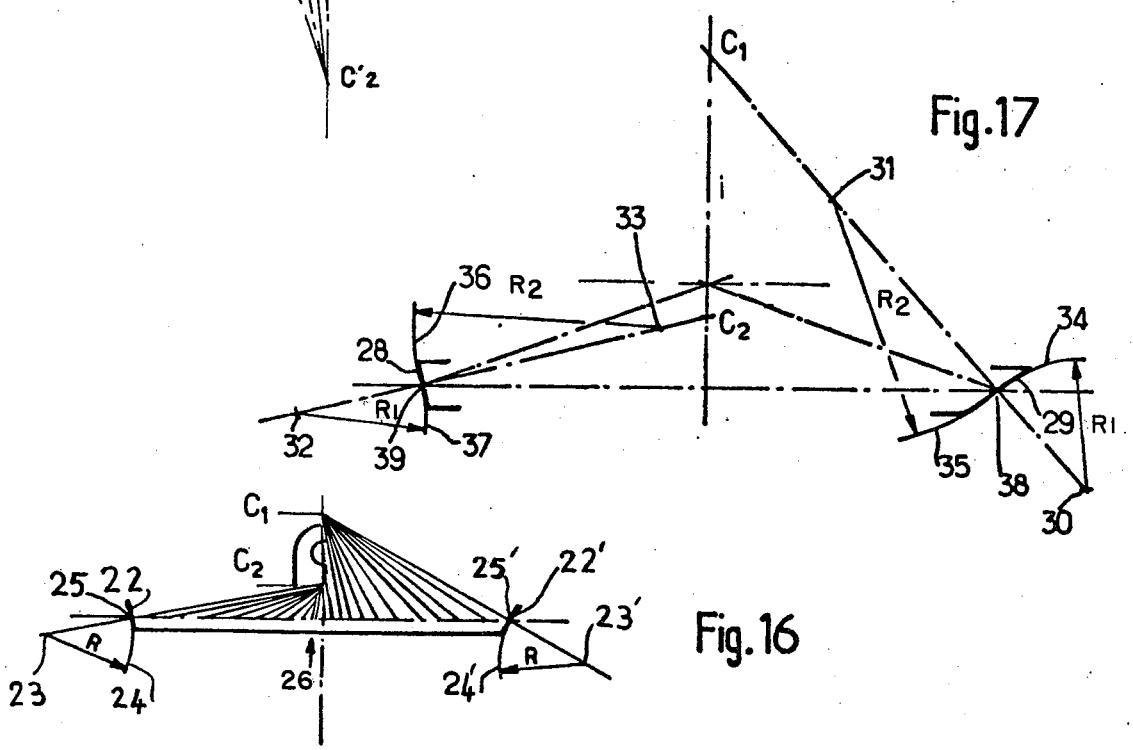
FIG. 17 is a schematic representation of a butterfly closure having a peripheral edge surface in bitoroid form.

Thus in the modes of realization represented in FIGS. 9 and 17, the axis of rotation 11 of butterfly gate 12 and the axis of symmetry 13 of butterfly gate 12 and of the joint (not shown) intersect (no off-center).

It should be recalled that the problem which the invention aims to solve is to define a form of the peripheral edge surface 14 of the butterfly gate 12 such that the resisting stresses on the latter at the time of opening of the valve may have, in relation to the axis of rotation 11 of the drive shaft, a torque which is substantially zero.

At the time of the opening, the directions of the restraining forces F are inclined in relation to the normal $\vec{n}$ to the section of the peripheral edge surface of the butterfly gate in the plane P perpendicular to the axis of rotation 11 of the shafts (FIG. 9) by an angle equal to the angle of friction of the torque seat-range of butterfly gate 12.

The directions of the restraining force F thus defined can pass through the axis of rotation 11, or else be directed in such a way that the restraining forces create a minimum resistant torque on opening, or a driving torque to the opening.

Figure 10:
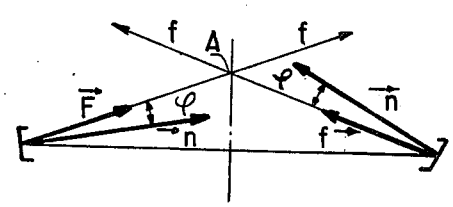
FIGS. 10 and 11 are schematic representations illustrating the resultant resisting stress imposed on the butterfly gate on the opening of the valve, for forms of the peripheral edge surface of the butterfly such that the restraining forces pass through the axis of the butterfly gate (FIG. 10) and do not pass through the axis of the butterfly gate but present a minimum resultant torque (FIG. 11)
Figure 11:
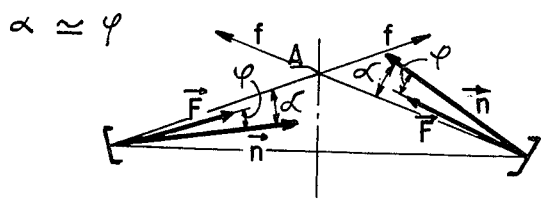

These two cases are illustrated by FIGS. 10 and 11 in which there is represented in the plane P the restraining forces F applied against butterfly gate 12, at the time of the opening, in the case where they pass through the axis of rotation 11 and in the case where they do not pass through the axis of rotation 11 but where they present a minimum resultant torque. On these figures one has designated by:

$\vec{n}$: the nomal to the section of the peripheral edge surface in the plane P;

$\vec{F}$: the configuration of the restraining force on butterfly gate 12 at the time of the movement of opening;

$\vec{N}$: the normal to the peripheral edge surface in the plane passing through the axis of the seat 13;

f: the straight line joining the point of contact of the seat to the axis of rotation;

$\phi$: the angle of friction of the torque seat-peripheral edge surface of the butterfly gate 12; and, $\alpha$: the angle of offset displacement.

The direction of $\vec{n}$ can thus be defined for each point of the surface of the peripheral edge surface 14 in the plane P.

The perpendicular t to the normal $\vec{N}$ and the tangent in the plane 7 to the circle of the peripheral edge surface of the butterfly gate define the plane tangent T to the surface of the seat of the butterfly gate, the form of the peripheral edge surface 14 of butterfly gate 12 being, as far as it is concerned, defined by the circle of the peripheral edge surface of the butterfly gate 12 and by the tangent planes T to the form at these points.

Figure 12:
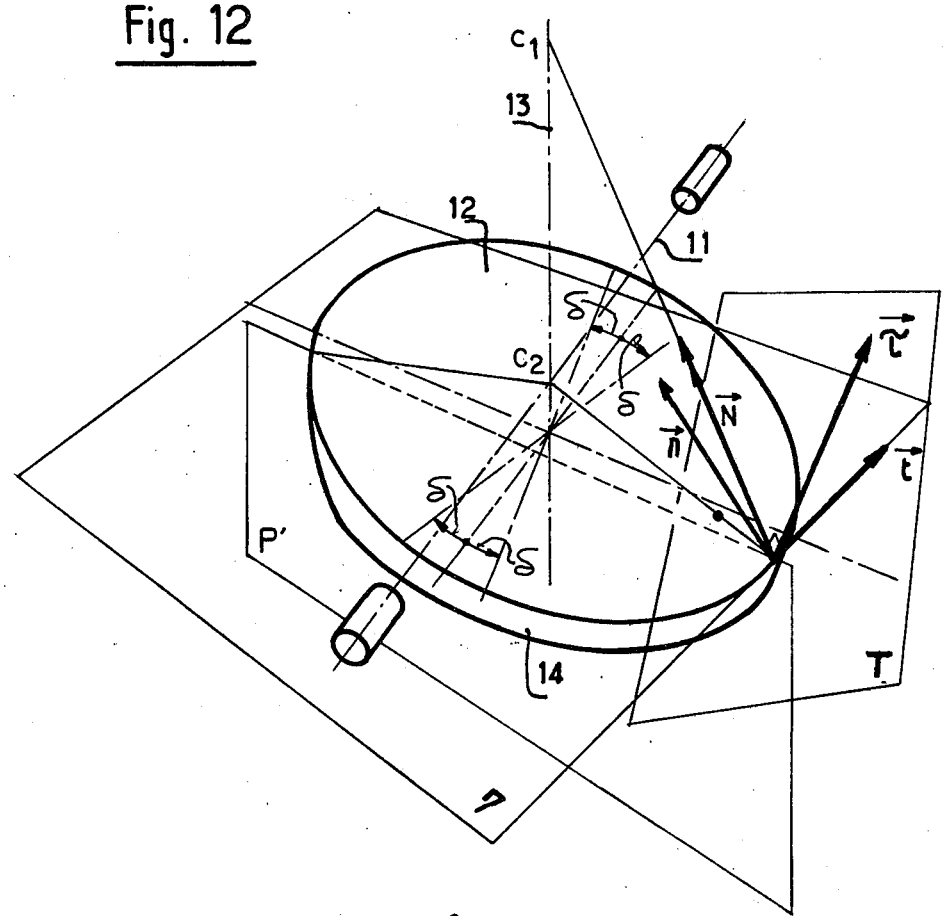
FIG. 12 is a schematic representation, of a butterfly closure having a peripheral edge surface shaped according to the invention, with its different parameters.
Figure 13:
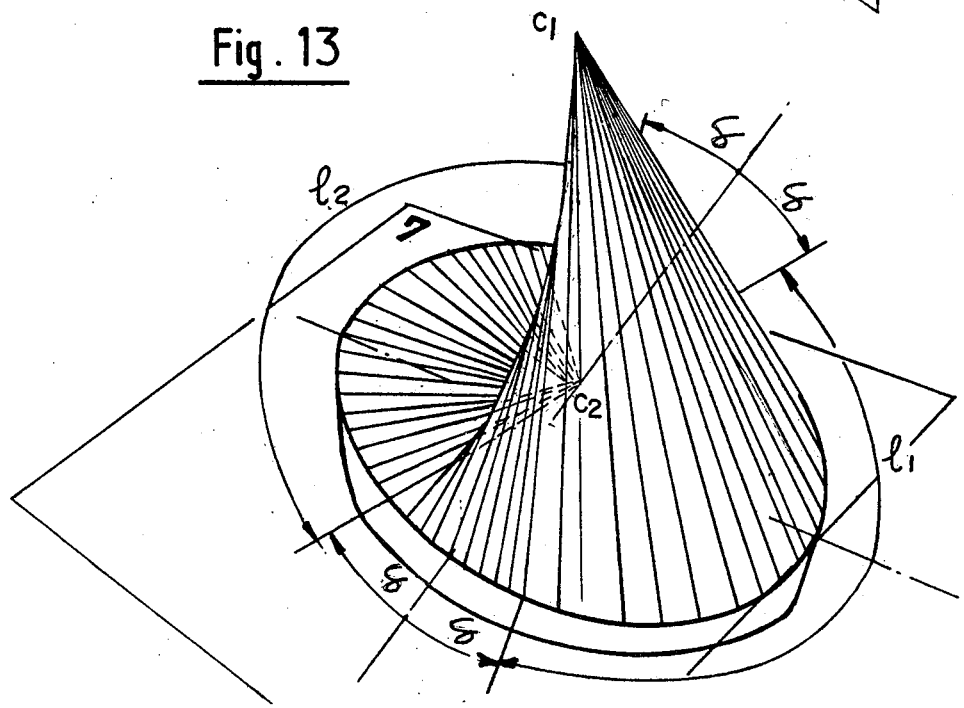
FIG. 13 is a representation of a butterfly gate in conformity with the one in FIG. 12 in which the character of the normals $\vec{N}$ to the range of the butterfly gate has been stated precisely.

The studies which have been carried out in the framework of the present invention have shown that the forms—making it possible to assure a distribution of the restraining forces on butterfly gate 12, such that their absolute value and their torque action in relation to the axis of rotation 11, be minimum—are such that the normals $\vec{N}$ to the form of the peripheral edge surface 14 of butterfly gate 12 on each of the circular portions $l_1$ and $l_2$ situated on both sides of the plane of symmetry of butterfly gate 12 passing through the axis of rotation 11 intersect the axis of symmetry 13 of the joint at two distinct points $C_1$ and $C_2$ (FIGS. 12 and 13).

In the zones situated on a level with the passages of axes defined by sectors δ, the intersection of the normals $\vec{N}$ to the form of the peripheral edge surface 14 of the butterfly gate with the segment $C_1$, $C_2$ evolve in a continuous manner between $C_1$ and $C_2$.

Figure 14:
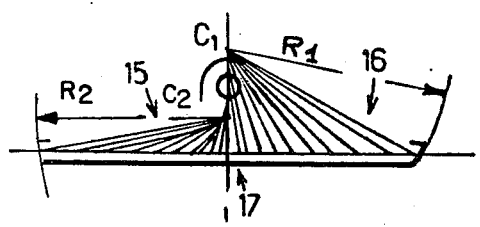
FIGS. 14, 15 and 16 are representations analagous to those of FIG. 13, in the case where the form of the peripheral edge surface of the butterfly is obtained by two spheres (FIG. 14), by two cones (FIG. 15) and by two concave radii (FIG. 16)
Figure 15:
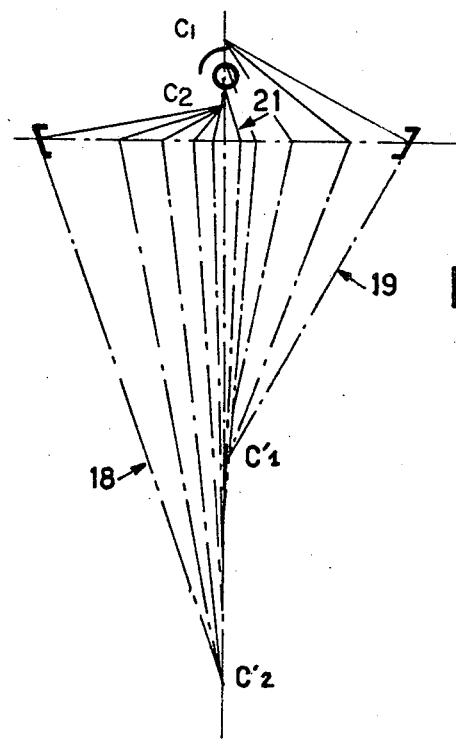
Figure 16:
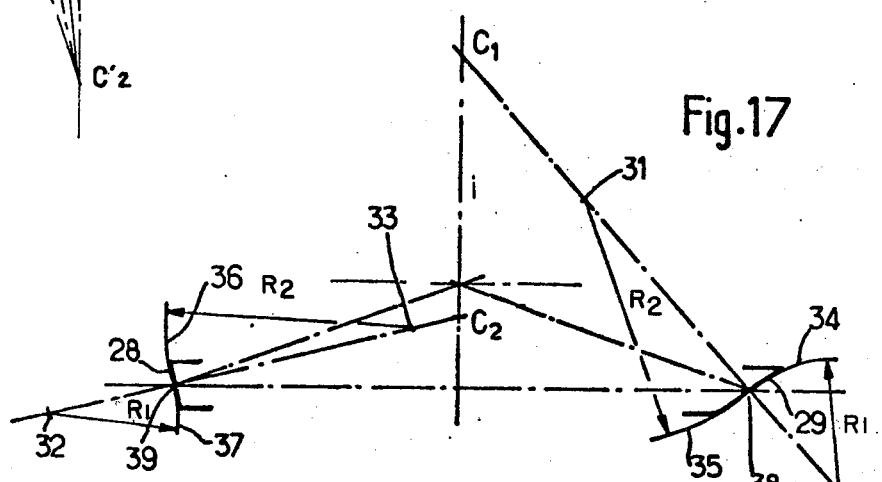

The forms of the peripheral edge surfaces 14 of butterfly gate 12 meeting these conditions can be very varied, and consist for example:

either, as represented in FIG. 14, in the joining together of two spherical portions 15 and 16 centered at distinct points $C_1$, $C_2$ connected between them by a continuous succession of elementary portions of spheres 17 assuring a progressive passage of one to the other;

either, as represented in FIG. 15, in the joining together of two conical portions 18 and 19 centered on the axis of symmetry of the seat and whose normals passing through the points of contact with the seat, are converging at the points $C'_1$ and $C'_2$ and connected between them by a continuous succession of elementary conical portions 21 whose angle at the apex varies progressively; either, as represented in FIG. 16, consisting in the combination or merging of two toroid surfaces 22, 22' whose centers 23, 23' of the generating circle 24, 24', the points of contact 25, 25', butterfly seat and the points $C_1$ or $C_2$ are brought into alignment, the joining between the two tori being effectuated then by a continuous succession of elementary toroid portions 26.

In the example represented in FIG. 16, there is represented a concave toroid form, it being well understood that it is equally possible to provide a convex toroid form, or alternatively, as represented in FIG. 17, consisting in the combination or merging of two bitoroid surfaces 28, 29 whose form is constituted by two portions of torus whose centers 30, 31, 32 and 33 of the director circles 34, 35 and 36, 37, the point of contact butterfly-seat 38, 39 and the points $C_1$ and $C_2$ are brought into alignment. In a manner analagous to the preceding, the connection between the two multitoroid surfaces is effected by a continuous succession of elementary multitoroid forms.

What is claimed is:

1. A butterfly valve having an unwedged butterfly gate, optionally off-centered in relation to its drive axis, and a seat perpendicular to the axis of the valve body, characterized in that the peripheral edge surface of said butterfly gate is formed by two surfaces whose cross-sections are curves of the same family, and has a configuration such that normals to it in the regions on both sides of the plane of symmetry of the butterfly gate containing the axis of rotation or parallel to it intersect the axis of symmetry of the seat, normal to the seat plane, at two distinct points, $C_1$ and $C_2$, when the butterfly gate is in the closed position, and the normals to one of the two surfaces converge at point $C_1$, situated on said axis of symmetry, above said axis of rotation and the normals to the second surface converge at point $C_2$ situated on said axis of symmetry under said axis or rotation, and that, for zones situated at the level of passage of the axis of rotation of the butterfly gate defined by sectors forming an angle δ on both sides of the plane of symmetry of the butterfly gate containing the said axis, or parallel to it, the points of intersection of the normals intersect the segment limited by said points $C_1$ and $C_2$, with the resulting variations of points of intersection being effected progressively in a continuous manner.

2. Butterfly valve according to claim 1, characterized in that said angle δ can vary from 0° to 90°.

3. Butterfly valve according to claim 1, characterized in that the peripheral edge surface of the butterfly gate is formed by the merger of two spherical forms centered at said points $C_1$ and $C_2$, and merged to each other through a continuous series of elementary spherical portions to provide a progressive passage from one of the spherical forms to the other.

4. Butterfly valve according to claim 1, characterized in that the peripheral edge surface of the butterfly gate is formed by the merger of two conical forms centered upon the axis of symmetry of the seat and whose normals pass through the points of contact of the seat, are concurrently at said points $C_1$ and $C_2$, and are connected to each other through a continuous series of elementary conical portions whose apex angle varies progressively.

5. Butterfly valve according to claim 1, characterized in that the peripheral edge surface of the butterfly gate is formed by the merger of two toroid surfaces, of which the center of the generating circle, the points of contact of the butterfly gate-seat and said points $C_1$ and $C_2$ are brought into alignment, the connection between the two toroid surfaces being formed by a continuous series of elementary toroid forms.

6. Butterfly valve according to claim 5, characterized in that said toroid surfaces are concave.

7. Butterfly valve according to claim 5, characterized in that said toroid surfaces are convex.

8. Butterfly valve according to claim 1, characterized in that the peripheral edge surface of the butterfly gate is formed by the merger of two multitoroid surfaces, formed by at least two portions of torus, of which the centers of the director circles, the points of contact of the butterfly gate-seat and said points $C_1$ and $C_2$ are brought into alignment, the connection between the two multitoroid surfaces being formed by a continuous series of elementary multitoroid forms.

9. Butterfly valve according to claim 1, characterized in that the peripheral edge surface of the butterfly gate is formed by the superposition of circular discs of low thickness, initially coaxial and machined such that the superposition presents a cross-sectional surface of revolution, the centers of which are then displaced and disposed according to a predetermined curve.

* * * * *